(12) United States Patent
Batni et al.

(10) Patent No.: US 9,229,693 B1
(45) Date of Patent: Jan. 5, 2016

(54) BUILD SERVICE FOR SOFTWARE DEVELOPMENT PROJECTS

(71) Applicant: Amazon Technologies, Inc., Reno, NV (US)

(72) Inventors: Dhruva Lakshmana Rao Batni, Seattle, WA (US); Aaron Michael Brown, Seattle, WA (US); Michael James Cobelli, Seattle, WA (US); Ian James Cullinan, Seattle, WA (US); James Alan Umstot, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/289,376

(22) Filed: May 28, 2014

(51) Int. Cl.
*G06F 9/44* (2006.01)

(52) U.S. Cl.
CPC .......................................... *G06F 8/37* (2013.01)

(58) Field of Classification Search
USPC .................. 717/120–122, 105–109, 173–174
IPC ....................... G06F 8/20,8/30, 8/71, 8/36, 8/37
See application file for complete search history.

(56) References Cited

U.S. PATENT DOCUMENTS

| | | | | |
|---|---|---|---|---|
| 5,680,619 | A * | 10/1997 | Gudmundson et al. | 717/108 |
| 6,738,964 | B1 * | 5/2004 | Zink et al. | 717/105 |
| 6,904,449 | B1 * | 6/2005 | Quinones | 709/203 |
| 7,047,518 | B2 * | 5/2006 | Little et al. | 717/108 |
| 7,334,216 | B2 * | 2/2008 | Molina-Moreno et al. | 717/109 |
| 7,640,533 | B1 * | 12/2009 | Lottero et al. | 717/108 |
| 7,644,392 | B2 * | 1/2010 | Geipel et al. | 717/121 |
| 7,676,788 | B1 * | 3/2010 | Ousterhout et al. | 717/106 |
| 7,873,958 | B2 * | 1/2011 | Wiltamuth et al. | 717/170 |
| 8,359,566 | B2 * | 1/2013 | Chaar et al. | 717/101 |
| 8,458,658 | B2 * | 6/2013 | Faus et al. | 717/121 |
| 8,464,228 | B2 * | 6/2013 | Campbell | 717/140 |
| 8,473,898 | B2 * | 6/2013 | Pandey | 717/107 |
| 8,533,676 | B2 * | 9/2013 | Watters et al. | 717/120 |
| 8,566,782 | B2 * | 10/2013 | Rigolet | 717/104 |
| 8,572,550 | B2 * | 10/2013 | Fox et al. | 717/101 |
| 8,612,931 | B2 * | 12/2013 | Bhandar et al. | 717/106 |
| 8,683,430 | B2 * | 3/2014 | Gonzales et al. | 717/109 |
| 8,701,082 | B2 * | 4/2014 | Gerken | 717/106 |
| 8,701,083 | B2 * | 4/2014 | Madkour et al. | 717/106 |

OTHER PUBLICATIONS

Reijonen et al, "Patterns for Configuration and Update Management in Distributed Machine Control Systems", ACM, pp. 1-6, 2010.*
Samuel et al, "Survivable Key Compromise in Software Update Systems", ACM, pp. 61-72, 2010.*
Kramer et al, "Using Document-Oriented GUIs in Dynamic Software Product Lines" ACM, pp. 1-10, 2013.*
Vieira et al, "Automation of GUI Testing Using a Model-driven Approach", ACM, pp. 9-14, 2006.*

* cited by examiner

*Primary Examiner* — Anil Khatri
(74) *Attorney, Agent, or Firm* — Davis Wright Tremaine LLP (57) ABSTRACT

A computing resource service provider may provide developers with access to a build service configured to generate compilation artifacts associated with software development projects. The build service may obtain a build description and source code suitable for generating the compilation artifact. The build service may then cause one or more build resources to be provisioned and included in a build instantiation using computing resources of the service provider. The build instantiation may generate the compilation artifact, using the one or more build resources, based at least in part on the obtained source code. The developer may then be provided with access to the compilation artifact generated by the build instantiation.

20 Claims, 8 Drawing Sheets

BUILD SERVICE FOR SOFTWARE DEVELOPMENT PROJECTS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers, online merchants and developers, who traditionally used on-site servers and storage equipment to host their websites and store and stream content to their users, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs.

In addition, large open source software development projects (e.g., Chromium) may have thousands of contributors modifying source code associated with the software development project at any given time. Furthermore, other large software development projects may require collaboration between multiple software development teams which may be geographically disburse from one another and/or the computing resources of the service provider. Software development projects may also contain software code that may take a very long time (often on the order of hours or longer) to build on a software developer's personal computer or other computing resource accessible to the software developer. This may lead to delay and inefficiencies in the software development cycle. Software developers may mitigate some of these problems by purchasing high-power severs and other computing resources to reduce build time but this can be extremely expensive and difficult to do at scale. Furthermore, these high-power severs may remain idle between build projects, remaining under-utilized for long periods of time.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements to software development services offered by a computing resource service provider (also referred to simply as a service provider). Service providers may offer a variety of services using computing resources operated by the service provider, the services may be utilized by software developer (also referred to as simply developers) to enable development and collaboration on various software development projects. For example, developers may utilize the service provider's virtual computing service to operate virtual computing instances executed on computing resources of the service provider in order to generate and build software projects. Furthermore, the service provider may provide developers with a management console or similar interface, exposed to the developer as a webpage, to enable simple and efficient management of software development projects.

As noted above, various software development projects may require significant computing resources and computing time to build creating inefficiencies in the software development process. In an embodiment, a service provider leverages its computing resources to offer services that enable software developers to utilize the high-powered severs and other computing resources of the service provider to complete software builds quicker and more efficiently. For example, the service provider may provide software developers with access to one or more virtual computing instances provisioned with sufficient computing resources to accomplish efficient build times for any size project. Furthermore, the service provider may allow multiple developers access to the shared computing resources of the service provider in order to reduce the cost associated with access to the computing resources of the service provider.

Furthermore, in some examples, the service provider also provides a software code repository (also referred to as a code repository) configured to store and manage source code for a particular developer. The software code repository may be a public code repository such that no credential information or other authentication information is required to access the code repository such that access to the software code repository may be limited to one or more particular developers. Furthermore, a particular developer's changes may be considered private developer data and may be managed such that access to the changes and associated developer data is limited. Developers may also trigger and/or cause software builds to be initiated automatically once changes to the software code in a particular repository have been pushed to the particular repository or manually by generating a request through the management console, as described above. Compilation artifacts could be delivered securely and efficiently on a storage service offered by the service provider. Compilation artifacts may include a result from the software build such as executable code, binary file, software library, failure notice or any other data generated by the virtual computing instance executing the software build. Furthermore, the compilation artifacts may result from a build of the source code associated with the software development project.

The service provider may also provide optimized computing resources configured to build particular software development projects more efficiently. For example, for large open source software development projects the service provider may offer optimized computing resources configured to quickly and/or more efficiently build source code associated with the project than un-optimized computing resources. The service provider may also optimize computing resources for a particular software development project based at least in part on a request from particular developer. For example, the software developer may request optimization for a particular software development project or a particular build of the software development project. The service provider may also automatically optimize the computing resources for software development projects. Optimization of computing resources may include caching information required for the software build, maintaining the availability of particular computing resources, increasing the computing resources used to perform the software build or other techniques suitable for reducing the time required for a software build.

The service provider may also provide a library of virtual computing system images for developers to choose from, each virtual computing system image may be configured to include the computing resources required to build one or more software development projects. The user may also create a virtual computing system image using an interface of the service provider, such as the management console described above. The service provider may also obtain information corresponding to the computing resources required for the software build from a code repository operated by the software developer. For example, the software developer may maintain configuration information for the computing resources required to build the software development project such as databases, networking interfaces, operating systems, compilers, cache size and/or type, processor type or other configuration information required to build the software development project.

Furthermore, the software developer may define a build description or cause the service provider to define a build description suitable for generating a build instantiation capable of building the software development project. The build instantiation may include build resources, the build resources may be computing resources required to complete the software build. For example, the build resources may include a database or other component used to execute a build for a software development project. The build description may be generated by the developer based at least in part on user input from the developer. For example, the developer may define the computing resources required through an interface such as the management console described above. Furthermore, the service provider may automatically generate a build description based on computing resources utilized by the developer to complete the build. For example, the developer may set up an initial build of the software project and the service provider may determine the build description based at least in part on the computing resources utilized to complete the initial build.

Figure 1:
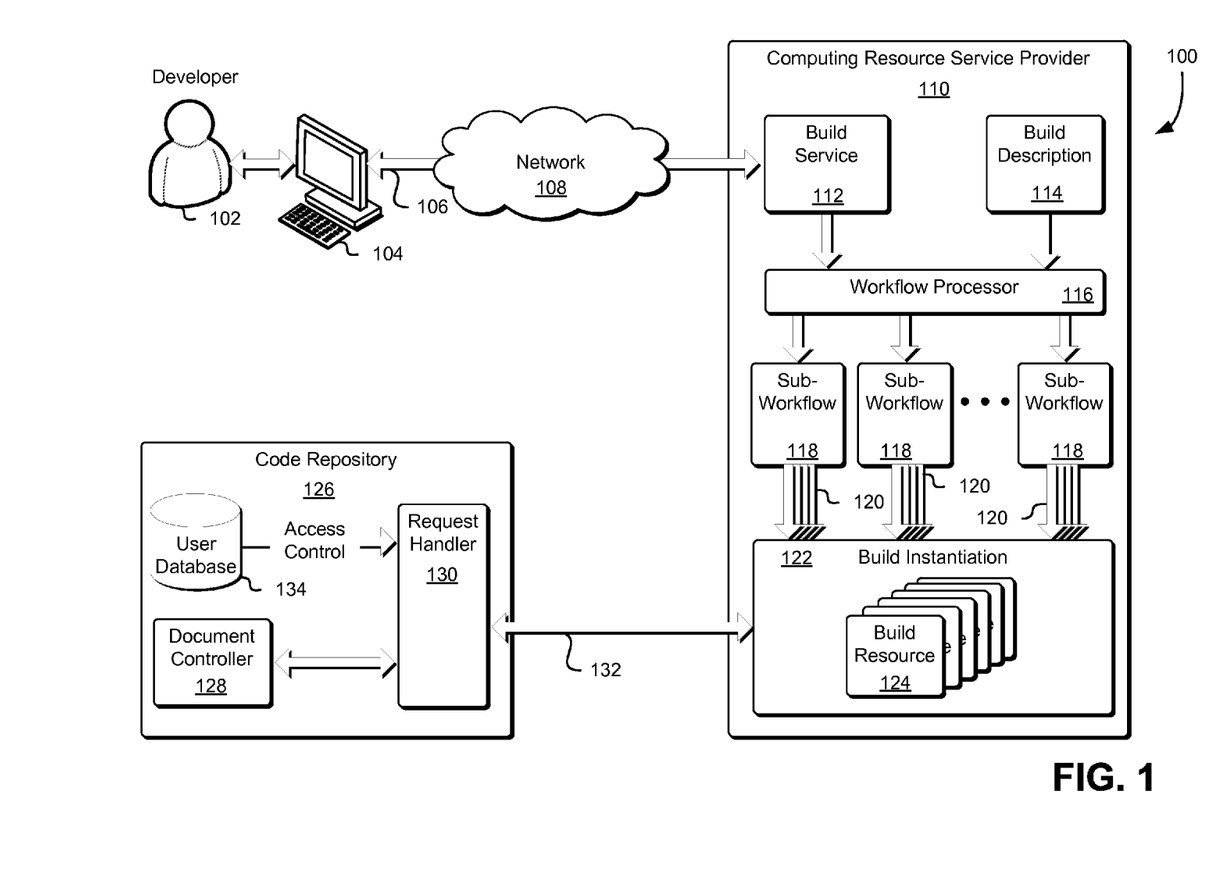
FIG. 1 is an environment illustrating a build service useable to generate a compilation artifact in accordance with at least one embodiment.

FIG. 1 illustrates an example environment 100 where a computing system, as well as the associated code running thereon, may be used to perform one or more commands associated with a build description and/or a build instantiation in order to create a compilation artifact corresponding to a software build. A compilation artifact may include a variety of data resulting from building source code of a software development project such as an executable, a software library, a binary file, an error log, a test result, additional source code, a configuration file, a build description or any other information resulting from a computing system performing one or more operations on source code of the software development project. A developer 102 (also referred to as a user) may connect 106 to a build service 112 through a computer system client device 104 and may initiate a connection with and/or interaction with one or more computing resources under the control of the build service 112 or a computing resource service provider 110. The build service 112 may be operating within the computing resource service provider 110 environment or may be at least partially hosted on resources outside of the computing resource service provider 110 environment. For example, the build service 112 may include a code repository 126 maintained by the developer 102 or another service provider.

In some embodiments, the computing resource service provider 110 may provide a distributed, virtualized and/or datacenter environment within which one or more applications, processes, services, virtual machines and/or other such computer system entities may be executed. In some embodiments, the developer 102 may be a person, or may be a process running on one or more remote computer systems, or may be some other computer system entity, user or process. The command or commands to connect to and or interact with the build service 112 may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. For example, the computer system client device 104 may be a virtual computer system instance executed on computing resources of the computing resource service provider 110 and operated by the developer 102.

In some embodiments, the command or commands to initiate the connection 106 to the computing resource service provider 110 may be sent to the build service 112, without the intervention of the developer 102. For example, the user 104 may edit source code associated with a particular software development project using the computer system client device 104 and the build service 112 may automatically generate a compilation artifact corresponding to the user 104 edited source code once the user has finished editing the source code. The command or commands to initiate the connection 106 to the build service 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The developer 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the build service 112 may include any device that is capable of connecting with a computer system via a network, including at least servers, laptops, mobile devices such as smartphones or tablets, distributed computing systems and components thereof, abstracted components such as guest computer systems or virtual machines and/or other types of computing devices and/or components. The network may include, for example, a public network such as the Internet, a wide-area network, a wireless network or a mobile network. The network may also operate in accordance with various protocols, such as those listed below, WiFi, cellular network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. For example, the computing resource service provider 110 may provider users 102 to access to one or more computing services configured to manage, generate, tear down or otherwise operate one or more computing resources on behalf of the user 104 required to build a compilation artifact corresponding to particular software development project. The computing resources and associated computing services may be defined in the build description 114 or may be determined by the computing resource service provider 110 based at least in part on the type and/or category of the computing resource required to build the compilation artifact.

The computing resource service provider 110 may also provide access to computer system resources such as user resources, policy resources, network resources, computing resources and/or storage resources. For example, the computing resource service provider 110 may provider the user 104 with access to a policy server in order to control access and/or access levels of particular users and/or services to at least a portion of the data associated with the software development project. The policy server may be configured to generate a token configured to enable a build instantiation 122 to access the code repository 126 in order to obtain the source code necessary to build the compilation artifact. In some distributed and/or virtualized computer system environments, the resources associated with the computer services may be physical devices, virtual devices, combinations of physical and/or virtual devices or other such device embodiments. For example, the build instantiation 122 may include a combination of virtual computing devices and associated physical devices. In some embodiments, the host machines, executing the build instantiation 122, may be physical machines located within the computer system environment. In some embodiments, the host machines may be guest virtual machines operating on physical machines located within the computer system environment.

The connection 106 may be used to issue one or more commands to perform one or more operations associated with the build description 114 and/or an existing build instantiation 122. For example, operations may be issued from the build service 112 to be executed by a workflow processor 116 to create the build instantiation 122 described in the build description 114 in response to a command from the user 104 to build the compilation artifact. In such an example, the workflow processor 116 may create one or more sub-workflows 118 (or parallelizable sub-workflows) to create the resources associated with the build description 114 and may cause those sub-workflows 118 to be executed 120 to create the build instantiation 122 comprising one or more build resources 124. The one or more build resources 124 may include any of the computing resources or computing services described herein. Particular examples of build resources 124 are described in detail below in connection with FIG. 5. The build resources 124 may be defined in the build description 112 or may be determined based at least in part on information contained in the build description 112. For example, the build description 112 may indicate that a particular build of the software development project requires a network interface, the build service 112 or other service of the computing resource service provider 110 may determine a particular virtual network interface card useable in building the compilation artifact to include as a build resource 124 in the build instantiation 122.

The sub-workflows 118 may be executed 120 in parallel, or in sequence or in a combination of in parallel and in sequence according to the dependencies between the sub-workflows. In another example, operations may be sent from the build service 112 to be executed by the workflow processor 116 to delete or tear down the build instantiation 122. The workflow processor 116 may determine the sub-workflows 118 and the execution 120 from the build description 114, or may determine the sub-workflows 118 and the execution 120 from the build instantiation 122 or may determine the sub-workflows 118 and the execution 120 from a combination of these and/or other such properties associated with the build. In various embodiments, the build description 114 indicates build resources 124 that may be deleted or terminated after the compilation artifact has been generated.

A connection 132 may be used to provide the build instantiation 122 with source code or other data required to generate the compilation artifact associated with the one or more command provided by the user 104 from the code repository 126. For example, the user 104 may request a compilation artifact corresponding to a particular version of the source code associated with the software development project and stored in the code repository 126. The build instantiation 122 may establish connection 132 in order to retrieve the version of the source code indicated by the user 104 in the request for the compilation artifact from the code repository 126. The build instantiation 122 may then generate the compilation artifact based at least in part on the source code received from the code repository 126. The code repository 126 may contain a request handler 130, a user database 134 and a document controller 128. The code repository 126 may include one or more other computing resources or computing services suitable for providing document access and versioning control systems.

The request handler 130 may be configured to receive requests and determine one or more operations to perform in response to the request. For example, when the build instantiation 122 requests a particular source file from the code repository 126, the request handler 130 may determine whether to allow access to the particular source file based at least in part on a token or other information included in the request and information contained in the user database 134. Furthermore, if it is determined that access is allowed the request handler 130 may request the particular source file from the document controller 128. The document controller 128 may be responsible for maintaining and/or managing version information associated with one or more source files. The document controller 128 may also maintain a set of differences between versions of various source files stored in the code repository 126. In various embodiments, the document controller 128 is responsible for maintaining the build description 114 and/or versions of the build description 114.

Figure 2:
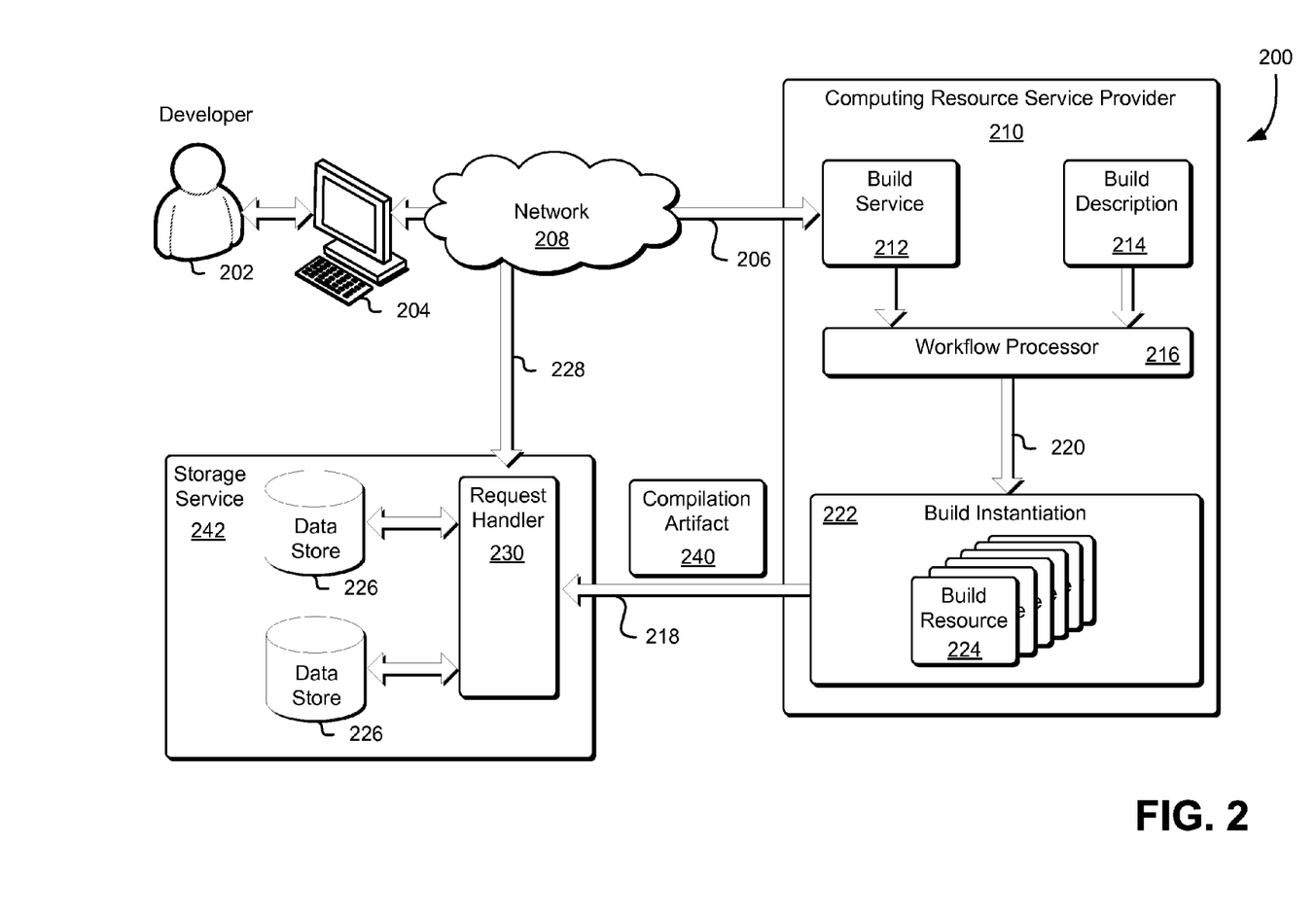
FIG. 2 is an environment illustrating a build service storing a compilation artifact with a storage service in accordance with at least one embodiment.

FIG. 2 illustrates an example environment 200 where a computing system, as well as the associated code running thereon, may be used to perform one or more commands associated with a build description 214 and/or a build instantiation 122 in order to create a compilation artifact 240 corresponding to a software build. A developer 202 may connect 206 to a build service 212 through a computer system client device 204 and may initiate a connection with and/or interaction with one or more computing resources under the control of the build service 212 or a computing resource service provider 210. The build service 212 may be operating within the computing resource service provider 210 environment or may be at least partially hosted on resources outside of the computing resource service provider 210 environment. Furthermore, the developer 102 may connect 228 with a storage service 242 in order to obtain the compilation artifact 240. The storage service 242 may include one or more computing resources under the control of the build service 212 or a computing resource service provider 210.

For example, the computing resource service provider 210 may further include the storage service 242. The storage service 242 may be a collection of computing resources configured to synchronously process requests to store and/or access data. The storage service 242 may operate using computing resources (e.g., databases) that enable the storage service 242 to locate and retrieve data quickly, so as to allow data to be provided in response to requests for the data. For example, the storage service 242 may maintain stored data in a manner such that, when a request for a data object is retrieved, the data object can be provided (or streaming of the data object can be initiated) in a response to the request.

As noted, data stored in the storage service 242 may be organized into data objects. The data objects may have arbitrary sizes except, perhaps, for certain constraints on size. Thus, the storage service 242 may store numerous data objects of varying sizes. The storage service 242 may operate as a key value store that associates data objects with identifiers of the data objects which may be used by the user 204 to retrieve or perform other operations in connection with the data objects stored by the storage service 242. The storage service 242 may contain one or more data stores 226 configured to store data objects as described above. The one or more data stores 226 may be virtual or physical storage devices such as hard disk drives. In order to enable access to data objects stored in the one or more data stores, the storage service 242 may contain a request handler 230. The request handler 230 may maintain the key value store responsible for associating the data objects with identifiers of the data objects. For example, the request handler 230 may receive a request from the computer system client device 204 including an identifier of a particular data object. The request handler 230 may then retrieve the particular data object based at least in part on the identifier and provide the particular data object in response to the request.

The connection 206 may be used to issue one or more commands to perform one or more operations associated with the build description 214 and/or an existing build instantiation 222. For example, operations may be issued from the build service 212 to be executed 220 by a workflow processor 216 to create the build instantiation 222 described in the build description 214 in response to a command from the user 204 to build the compilation artifact 240. In such an example, the workflow processor 216 may cause one or more build resources 224 associated with the build description 214 to be created for use with the build instantiation 222. In various embodiments, the build resources 224 are already created and executing on computing resources of the computing resource service provider 210 and the build service 212 makes the build resources 224 available to the build instantiation 222.

The build instantiation 222 may use the build resources 224 to generate the compilation artifact 240. The compilation artifact 240 may be based at least in part on source code provided by the developer 102. For example, the developer 102 may generate the source code using computer system client device 204 and transmit the source code to the build service 212 over connection 206. The source code may provide instructions, that when executed by the build instantiation 222, generate the compilation artifact 240. The compilation artifact 240 may be a result of the build instantiation 222 executing the source code. The build instantiation 222 may cause the compilation artifact 240 to be transmitted to the storage service 222 over connection 218. For example, the build service 212 may receive the compilation artifact 240 from the build instantiation 222 and transmit the compilation artifact 240 to the storage service 242.

Once received by the storage service 242, the request handler 230 may generate an identifier of the compilation artifact 240 and provide the identifier to the build service 212 or other service of the computing resource service provider 210. In various embodiments, the storage service may be configured to provide the identifier of the compilation artifact 240 directly to the user 204. For example, the build instantiation 222 may transmit a request to the storage service 242 to store the compilation artifact 240, and the request may contain the compilation artifact 240 and information configured to identify the user 204 such that the storage service may transmit to the user an indication of the identifier of the compilation artifact 240. In another example, the build service 212 may receive the identifier of the compilation artifact 240 and may provide the identifier to the developer 102 over connection 206. The developer 102 may then obtain the compilation artifact 240 from the storage service 242 based at least in part on the identifier of the compilation artifact 240 over connection 228. The identifier of the compilation artifact may be a reference to information configured to provide a location of the compilation artifact such as a uniform resource locator (URL) or uniform resource identifier (URI).

Figure 3:
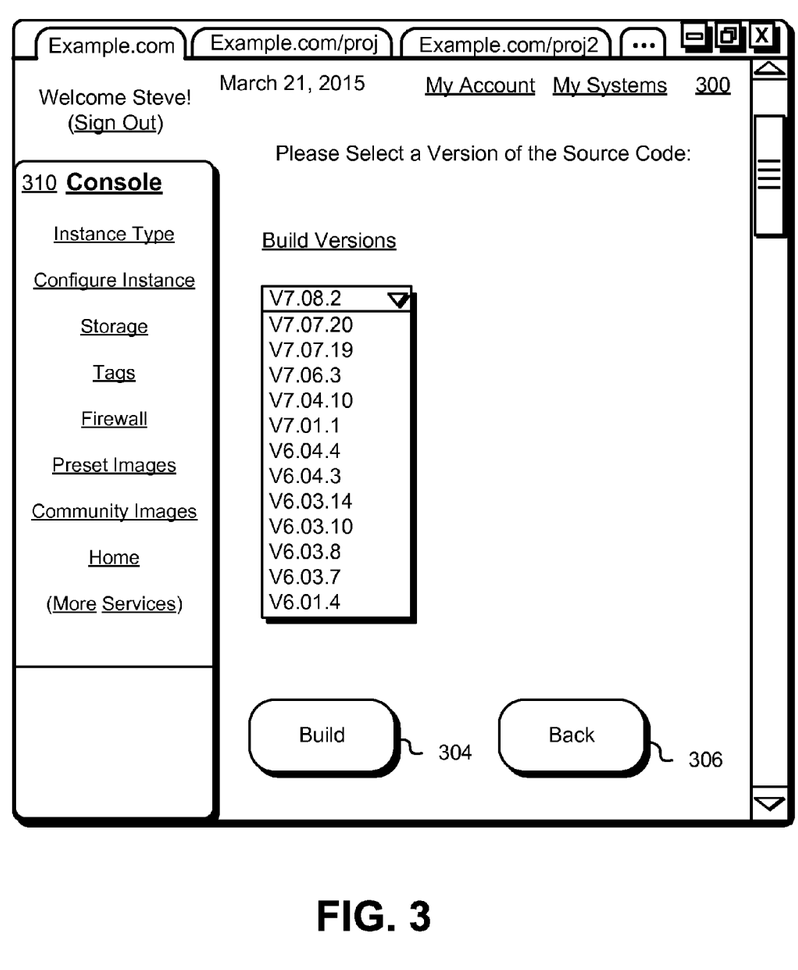
FIG. 3 is a diagram illustrating a management console exposed as a webpage in accordance with at least one embodiment.

FIG. 3 shows a webpage 300 which may be displayed by an application executed by a computing device enabling a user to interact with a build service operated by the computing resource service provider. As illustrated in FIG. 3, the webpage 300 includes various graphical user interface elements that enable users to provision, manage and interact with build instantiations through a management console which the webpage 300 is a part. In various embodiments, the user interacts with the build instantiation by issuing commands to the build service through the management console. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to a variety of different actions the user may cause to be performed. The console pages may correspond to operations that may be taken to manage or otherwise control build instantiations by the build service or other computing services of the computing resource service provider. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server.

In this example, the webpage 300 also includes a graphical user element configured as a "build" button 304. The build button 304 may be a graphical user interface element of the webpage 300 where the underlying code of the webpage 300 is configured such that selection by an input device of the build button 304 causes information corresponding to the selection of a particular build version selected on the webpage 300 to be transmitted to one or more servers of the service providers, such as the servers responsible for executing the build service. Furthermore, through the management console, the user may be guided through the process of setting up a build description and/or build instantiation. The process may be divided into steps and the user make be prompted to provide information at each step. For example, the webpage 300 displays to the user a list of different types of computing resources suitable for building a compilation artifact from source code. The user, using an input device, may select a particular preset build description or may select one or more computing resources to include in the build description. The user selection may be stored until the entire process is completed or the user selection may be transmitted to the build service upon selection of graphical user interface element.

As illustrated in FIG. 3, the webpage 300 may contain a graphical user interface element configured as a dropdown list to display version information associated with the software development project. The version information may correspond to a particular version of one or more source files associated with the software development project and may include a version identifier. For example, the user may select a particular version of the software development project to build a compilation artifact for and perform one or more test operations utilizing the compilation artifact. Furthermore, the version identifiers may be a unique identifier and a cryptographically secure identifier thereby providing at least some assurance that the version of the source file selected by the user is in fact the version of the source file obtained for the purposes of building the compilation artifact. The management console of which webpage 300 is a part of may also be configured such that the management console is connected to or responsible for a code repository as described above in connection with FIG. 1. For example, the management console may provide an interface for retrieving source code from the code repository and/or storing changes to the source code in the code repository.

The webpage 300 may also include a graphical user element configured as a "back" button 306. The back button 306 may be a graphical user interface element of the webpage 300 where the underlying code of the webpage 300 causes the application displaying the webpage 300 to navigate to a previously navigated webpage. In this example, the webpage 300 contains a prompt asking the user to select a particular version of the source code associated with the software development project from a dropdown list. The version of the source code selectable using the webpage 300 may be included in webpage 300 based at least in part on user preference, popularity among users, features of the source code, features selected by the user, versions selected by the user, an administrator associated with the software development project, hardware systems available to the service provider or other information suitable for selecting a hypervisor or operating systems for use with one or more virtual machines. In various embodiments, the webpage 300 contains identifying information for portions of the software development project selectable by the user to generate a compilation artifact based at least in part on the portion selected by the user. For example, the webpage 300 may display a list of components of the software development project such as the networking component or the user interface component, and the user may then select a particular component to build a compilation artifact of the source code associated with the particular component.

Once the user has made a selection using the webpage 300 and selected the build button 304, the application displaying the webpage 300 may submit an HTIP request to the build service to generate a compilation artifact corresponding to the version of the source code selected by the user. The request may be transmitted to one or more servers of the build service operated by the computing resource service provider. Furthermore, the build service may obtain additional information from one or more other services in order to complete the request from the user. For example, the build service may obtain a build description from a code repository as described above in connection with FIG. 1. The build service may then cause a build instantiation to be provisioned based at least in part on the build description. The build instantiation may then build the compilation artifact based at least in part on a source file associated with the particular version information selected by the user through webpage 300. In various embodiments, the build service or other service of the computing resource service provider returns, in response to the HTIP request from the user, identification information configured to identify the complication artifact created in response to the user's HTIP request such that the user may obtain the compilation artifact based at least in part on the identification information.

Figure 4:
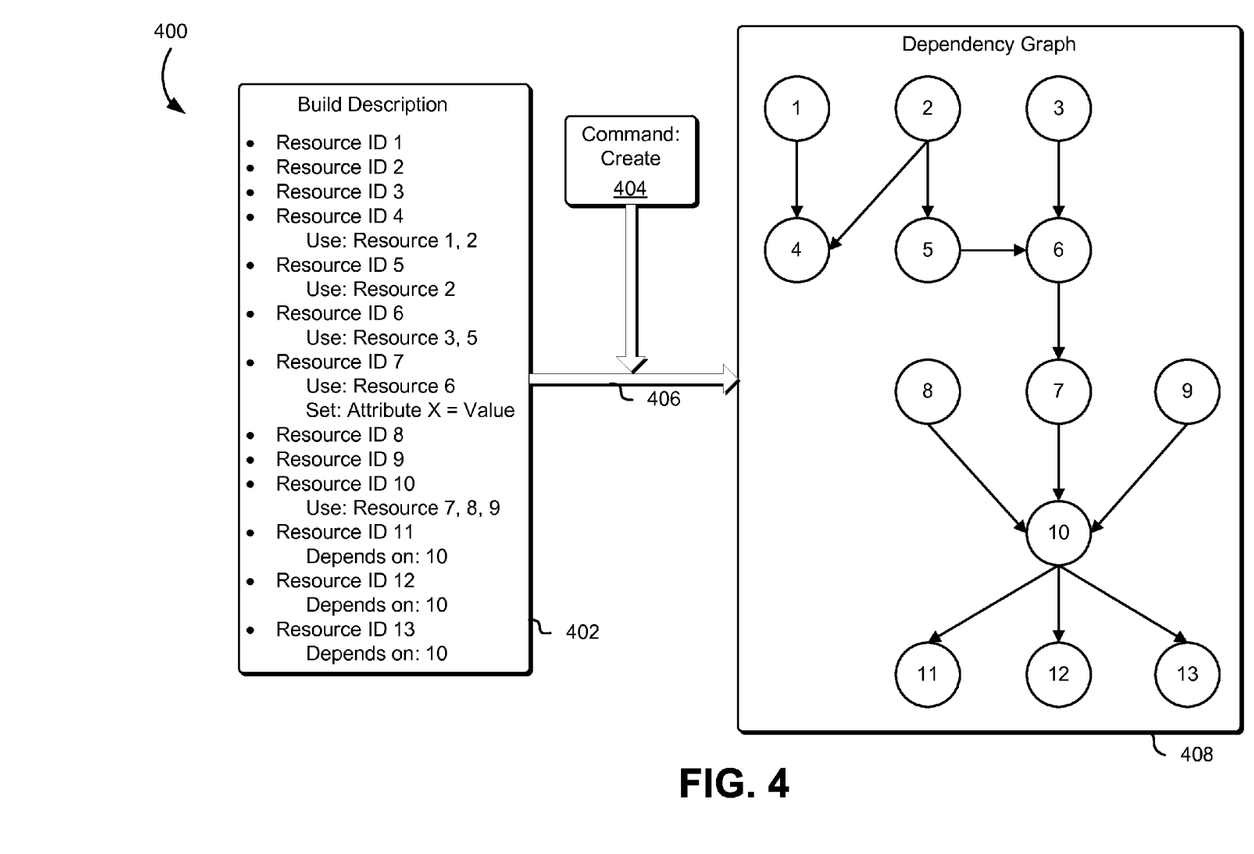
FIG. 4 is an environment illustrating a build description and corresponding dependency graph in accordance with at least one embodiment.

FIG. 4 illustrates an example environment 400 where a dependency graph may be created based at least in part on a build description and based at least in part on a received command from the user to generate a build description based at least in part on a build instantiation. A build description 402 and a command 404 may be received 406 by a workflow processor such as the workflow processor 116 described herein in connection with FIG. 1. In the example illustrated in FIG. 4, the command 404 is a command to create the build instantiation corresponding to the build description 402. The workflow processor may create a dependency graph 408 based on the information in the build description 402 and on the command 404. In the dependency graph 408, the nodes may be created with identifiers corresponding to the ID of the resource. For example, the resource with ID 1, on the first line of the build description 402 corresponds to the node labeled "1" in dependency graph 408. In the description of FIG. 4, a node corresponding to a resource with a given ID and labeled with that ID may be referred to simply as node "ID" (so, for example, a node corresponding to a resource with ID "1" and labeled as such may be referred to simply as node "1").

In FIG. 4, node "1" through node "13" in dependency graph 408 may correspond to the resources with ID 1 through ID 13. The dependency that resource ID 4 has on resource ID 1 is illustrated with the directed edge between node "1" and node "4" and the dependency that resource ID 4 has on resource ID 2 is illustrated with the directed edge between node "2" and node "4". The directed edge between node "1" and node "4" and the directed edge between node "2" and node "4" indicate that resource ID 1 and resource ID 2 must be created before resource ID 4 may be created. Similarly, resource ID 2 must be created before resource ID 4 may be created (dependency between node "2" and node "5"), resource ID 3 and resource ID 4 must be created before resource ID 6 may be created, resource ID 6 must be created before resource ID 7 may be created and so on. The dependencies represented by the edges between nodes in the dependency graph 408 correspond to the dependencies in the build description 402. Nodes with incoming edges (node "4", node "6", node "7", node "10", node "11", node "12" and node "13" in the example illustrated in FIG. 4) represent resources that may be dependent on one or more other resources. Nodes without incoming edges (node "1", node "2", node "3", node "8" and node "9" in the example illustrated in FIG. 4) represent resources that may not be dependent on other resources.

In some embodiments, the dependency graph 408 may be used to reduce the amount of time required to build one or more compilation artifacts. For example, if a particular dependency has not changed since the previous command to build a compilation artifact, the build service may not be required to re-build or re-create the particular computing resource associated with the nodes. The build service or other service may store or otherwise cache information associated with the nodes and use the cached information if none of the dependencies for the particular node has changed. The build description 402 and dependency graph 408 may also correspond to a particular version of the software development project or source code of the software development project. The build service may also cache previous versions of a compilation artifact and used the previously cached compilation artifact to more efficiently generate a new compilation artifact. The new compilation artifact may be generated based at least in part on changes to the source file associated with the previously cached compilation artifact.

Figure 5:
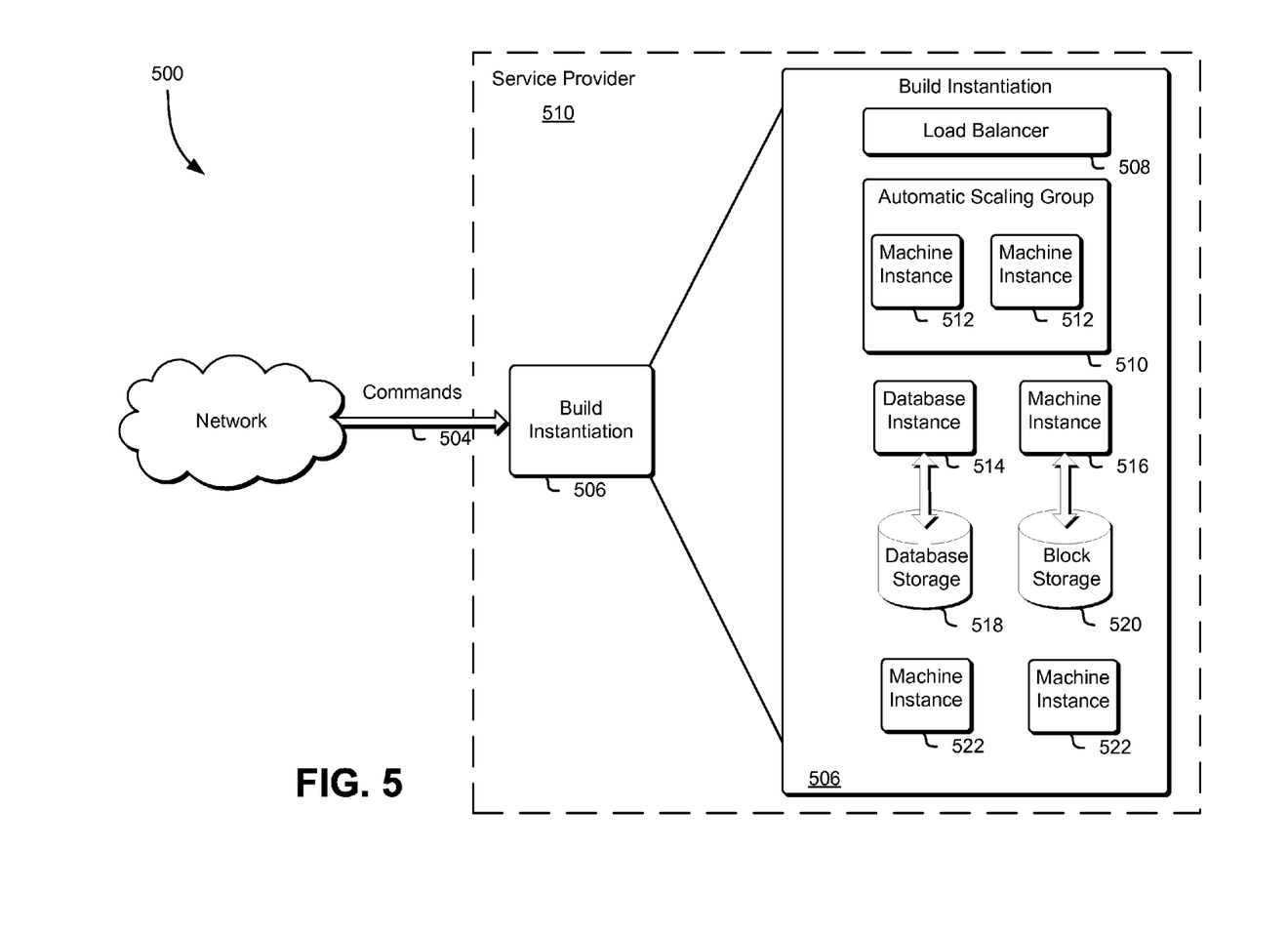
FIG. 5 is an environment illustrating a build instantiation useable in generating a compilation artifact in accordance with at least one embodiment.

FIG. 5 illustrates an example environment 500 where commands may be sent to a plurality of computing resources in a build instantiation 506 as described herein at least in connection with FIG. 1 and in accordance with at least one embodiment. Commands 504 may be received by build instantiation 506 from network 502 and/or entities associated therewith, such as servers or other computer systems also connected to the network, either directly or indirectly, as described at least in connection with FIG. 1. The build instantiation 506 may include a variety of computing resources, as described above. Examples of computer resources may include, but are not limited to, load balancers 508, automatic scaling groups 510, automatic scaling group machine instances 512, database instances 514 associated with database storage 518, machine instances 516 associated with block storage 520, independent machine instances 522 and/or other such computing system environment resources. The computing resources may be physical resources running directly on the computer system hardware, or virtual machines running on shared computer systems hardware or a combination of these and/or other resource types. A single build instantiation 506 may include a plurality of such computing resources and some or all of the plurality of such resources may be shared by one or more build instantiations.

At least a portion of the plurality of computing resources included in the build instantiation 506 may be defined or otherwise described in a build description associated with the software project as described above in connection with FIG. 1. The build service may obtain the build description and cause at least a portion of the computing resources defined in the build description to be provisioned and included in the build instantiation 506. The build service may also issue one or more commands 504 configured to cause the build instantiation 506 to generate a compilation artifact utilizing the computing resources included in the build instantiation 506.

Figure 6:
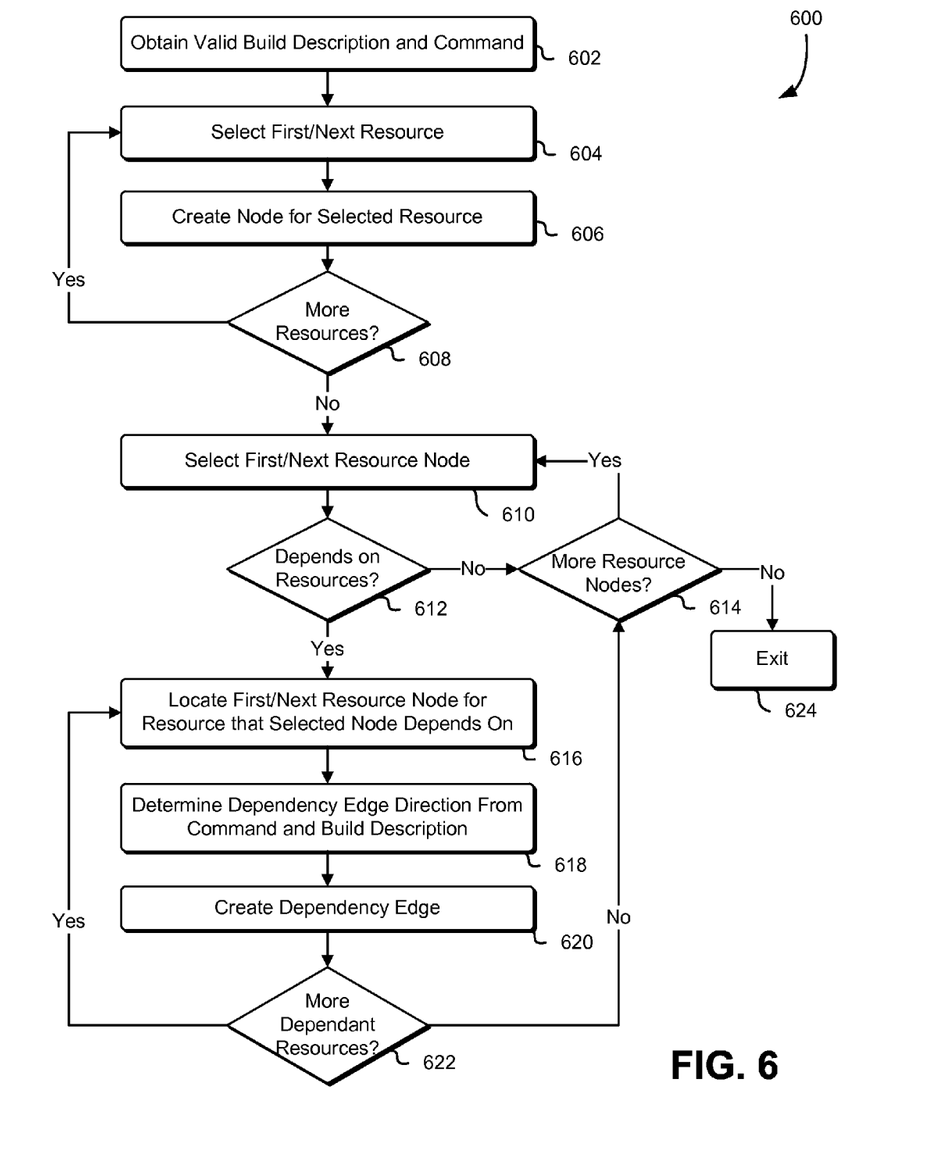
FIG. 6 is a diagram illustrating a process for generating a build description and dependency graph in accordance with at least one embodiment.

FIG. 6 illustrates an example process 600 for creating a dependency graph based at least in part on a build description and a command as described herein at least in connection with FIG. 1 and in accordance with at least one embodiment. A workflow processor such as the workflow processor 116 described herein at least in connection with FIG. 1 may perform at least a portion of the process illustrated in FIG. 6. Other entities operating within a computing system may also perform at least a portion of the process illustrated in FIG. 6 including, but not limited to, services, applications, modules, processes, operating system elements, virtual machine elements, network hardware, controlling domains (e.g., a hypervisor) or combinations of these and/or other such entities operating within the computing system. The process 600 may also be used to generate a build description and dependency graph based at least in part on a build instantiation created by a user.

A workflow processor may obtain a valid build description and command 602. The workflow processor may begin selecting resources 604 and creating nodes for the selected resource 606 until all resource nodes have been created 608. The workflow processor may then select the first resource node 610 and, based on the build description and/or based on an existing build instantiation, may determine whether the selected resource node depends on any of the other resources 612. If the selected resource node depends on any of the other resources 612, the workflow processor may locate the resource node that corresponds to the resource that the selected resource may depend on 616. The workflow processor may then determine the direction of the dependency edge 618 between the selected resource and the resource node that corresponds to the resource that the selected resource may depend on based at least in part on the command, the build description and/or the build instantiation.

For example, for a command to create a build instantiation, if there is a resource "A" that may depend on a resource "B", then resource "B" may be required to be created before resource "A". In such an example, the dependency edge may be drawn from resource "B" to resource "A" indicating that the creation resource "A" may depend on the creation of resource "B." By contrast, for a command to delete a build instantiation with the same relationship between resource "A" and resource "B", the dependency graph may be drawn from resource "A" to resource "B" indicating that the deletion of resource "B" may depend on the deletion of resource "A". In some embodiments a different dependency graph, with different edge directions may be created based on the build description, the command and/or the build instantiation. As may be contemplated, the methods of determining edge directions described herein are illustrative examples and other such methods of determining edge directions may be considered as within the scope of the present disclosure.

Upon determining the direction of the dependency edge 618 between the selected resource and the resource node that corresponds to the resource that the selected resource may depend on, the workflow processor may create a dependency edge 620. The workflow processor may then continue looking for more dependent resources 622 of the selected resource and may then repeat the process for additional resource nodes 614 until all resource nodes have been processed. The workflow processor may then exit 624 the process and present the dependency graph for further processing such as reducing the amount of time it may require to build a compilation artifact as described above in connection with FIG. 5.

Figure 7:
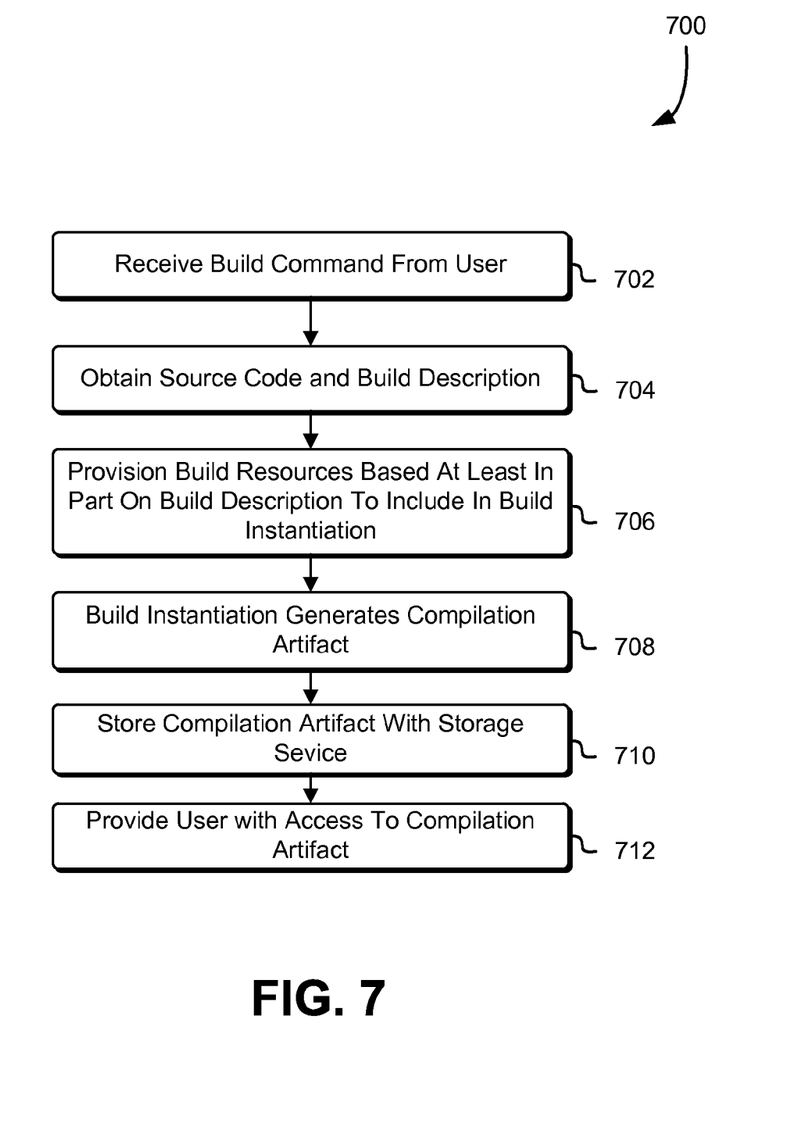
FIG. 7 is a diagram illustrating a process for generating a compilation artifact using a build service in accordance with at least on embodiment.

FIG. 7 shows an illustrative example of a process 700 which may be used to generate a compilation artifact corresponding to source code associated with a software development project. The process 700 may be performed by any suitable system, such as by the build service as described in connection with FIG. 1. Other suitable systems may perform a portion of the process 700, such as the storage service as described in connection with FIG. 2. Returning to FIG. 7, in an embodiment, the process 700 includes receiving a build command from the user 702. The build command may be received through a management console as described above in connection with FIG. 3. The command may include source code or other information suitable for generating a compilation artifact. For example, the build command may include a version identifier and a token configured to allow the build service to access a code repository and obtain the version of the source code indicated by the version identifier. The token may include credentials such as a user name and password.

The build service may then obtain the source code and a build description 704. The source code may include the entire source code associated with the software development project, a portion of the source code associated with the software development project or one or more changes to the source code generated by the user. For example, a client computing device may generate difference information indicating a difference between a particular version of the source code and a version of the source code modified by the user operating the client computing device. The client computing device may then include the difference information with the command to build the compilation artifact and the build service may obtain the source code based at least in part on the difference information. The build description may define the build resources and other information corresponding to the build instantiation as described above. The build description may be maintained by the build service and/or an administrator of the software development project.

Based at least in part on the build description, the build service may cause build resources to be provisioned and included in the build instantiation 706. The build resources may include a plurality of computing resources as described above in connection with FIG. 5. The build resources to include in the build instantiation may also be based at least in part on information determined from the source code. For example, the build service may determine one or more resources required to build the source code based at least in part on information obtained from the source code. Once the build resources have been provisioned and included in the build instantiation, the build service may cause the build instantiation to generate the compilation artifact 708. The compilation artifact may include a variety of information generated as a result of the build instantiation performing one or more operations on the source code as described above in connection with FIG. 2. For example, the build instantiation may compile the source code and generate an executable file based at least in part on the source code. In numerous variations of process 700, the process may terminate after generating the compilation artifact. A notification may then be sent to the developer indicating whether the compilation artifact was generated successfully.

The compilation artifact may then be stored with the storage service 710. In numerous variations to process 700, the compilation artifact may be transmitted directly to the client computing device operated by the user or to a code repository associated with the user. Returning to FIG. 7, the storage service may generate a data object identifier configured to identify the compilation artifact and enable access to the compilation artifact as described above in connection with FIG. 2. The build service or some other service of the computing resource service provider, such as the storage service, may provide the user with access to the compilation artifact 712. For example, the build service may return, in response to the command to generate the compilation artifact, the data object identifier generated by the storage service. The user may provide the data object identifier to the storage service and the storage service may then provide the user the compilation artifact indicated by the data object identifier. Providing access to the compilation artifact may include transmitting a reference to information associated with the compilation artifact to one or more users. For example, the build service may transmit a URL associated with the compilation artifact to a quality assurance user in order to enable the quality assurance user to perform one or more tests using the compilation artifact. The build service may also provide the compilation artifact to one or more other services which may perform a variety of different operations using the compilation artifact. For example, the build service may provide the compilation artifact to a performance service that measures the performance of the compilation artifact relative to one or more other compilation artifacts.

Figure 8:
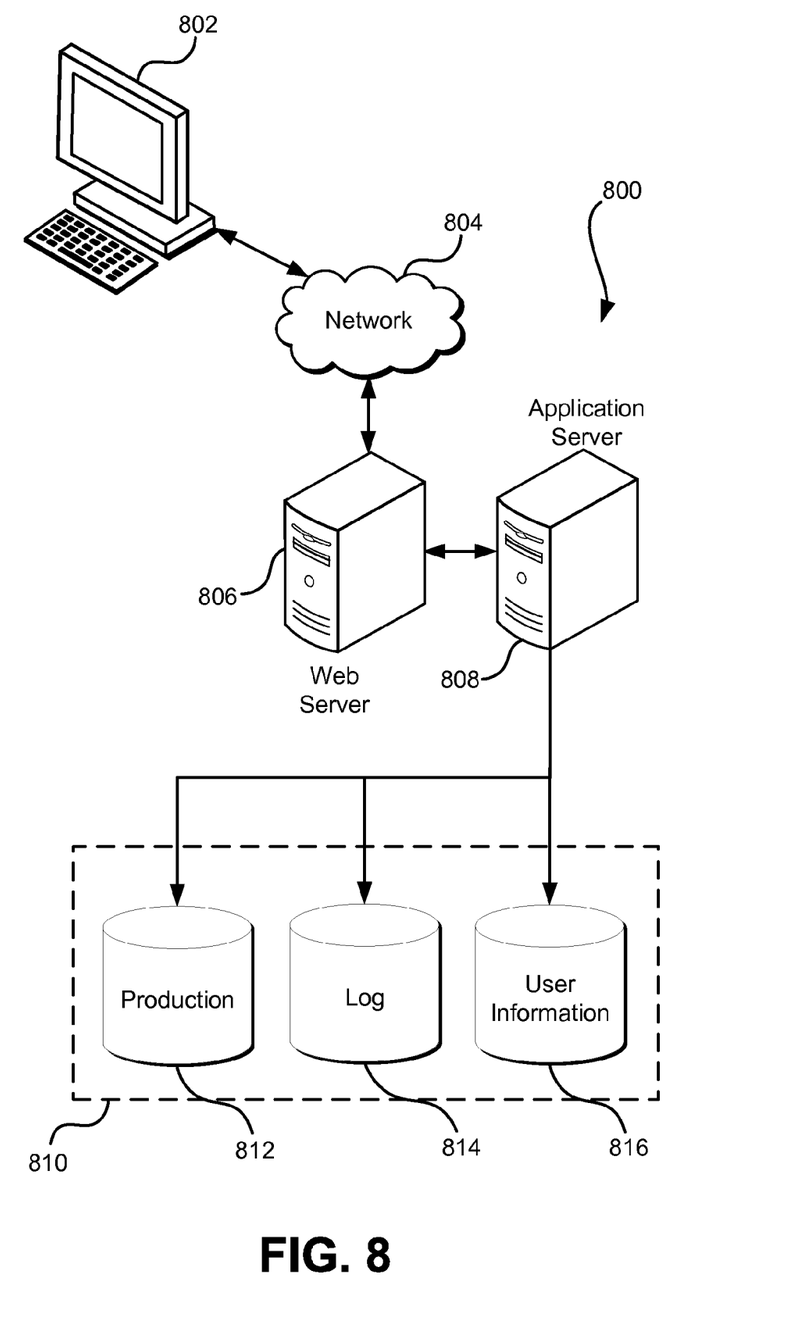
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
receiving, from a user, a command to generate a build of source code based at least in part on a source file included in a software development project indicated in the command;
determining a build description associated with the software development project and the source file, the build description defining one or more build resources useable in generating the build of source code;
provisioning the one or more build resources, utilizing computing resources of the one or more computer systems, defined in the build description to include in a build instantiation, where the build instantiation includes the provisioned one or more build resources connected over a network and configured to generate the build of source code based at least in part on the source file using the one or more build resources;
providing the build instantiation with access to the source file;
generating, by the build instantiation, the build of source code based at least in part on the source file, the build comprising a compilation artifact;
storing the build of source code with a storage service; and
enabling the user to access, over the network, the build of source code stored with the storage service.

2. The computer-implemented method of claim 1, wherein the build instantiation with access to the source file further includes obtaining the source file from a code repository associated with the software development project.

3. The computer-implemented method of claim 2, wherein obtaining the source file from the code repository further includes providing the code repository with a token configured to enable access to the source file for an amount of time.

4. The computer-implemented method of claim 1, wherein the computer-implemented method further includes determining the build description based at least in part on a previous build instantiation used to build a previous build of source code associated with the software development project.

5. The computer-implemented method of claim 1, wherein provisioning the one or more build resources further comprises optimizing the one or more build resources for generating the build of source code based at least in part on the build description and computing resources available to the one or more computer systems.

6. A system, comprising:
one or more processors;
memory with instructions that, when executed by the one or more processors, cause the system to:
receive a command to generate a compilation artifact associated with a software development project;
determine a plurality of computing resources of one or more other systems distributed over a network and connected to the system over the network, where the plurality of computing resources are capable of generating the compilation artifact;
provision a build instantiation including the plurality of computing resources, the build instantiation capable of generating the compilation artifact utilizing the plurality of computing resources distributed over the network;
generate, by the build instantiation, the compilation artifact based at least in part on source code corresponding to the software development project; and
enable the developer to access to the compilation artifact over the network.

7. The system of claim 6, wherein the instructions that cause the system to receive the command to generate the compilation artifact further include instructions that cause the system to receive the command through a management console exposed to a user as a webpage, the management console configured to receive user input and generate the command.

8. The system of claim 6, wherein the memory further includes instructions that, when executed by the one or more processors, cause the system to generate a build description based at least in part on user input where the build description defines the one or more build computing resources to include in the build instantiation such that the build instantiation is optimized for generating the compilation artifact.

9. The system of claim 6, wherein the memory further includes instructions that, when executed by the one or more processors, cause the system to obtain one or more changes to source code corresponding to the software development project and generate the compilation artifact based at least in part on the one or more changes to the source code.

10. The system of claim 6, wherein the instructions that cause the system to create the build instantiation further include instructions that cause the system to:
determine at least one data object for which a resource dependency remained unchanged; and
obtain a cached version of the at least one build resource to include in the build instantiation.

11. The system of claim 6, wherein the instructions that cause the system to enable access to the compilation artifact further include instructions that cause the system to provide a reference to information indicating a location of the compilation artifact to a user.

12. The system of claim 6, wherein the memory further includes instructions that, when executed by the one or more processors, cause the system to perform one or more operations associated with the compilation artifact without a contemporaneous input provided by a user.

13. A non-transitory computer-readable storage medium having collectively stored thereon executable instructions that, when executed by one or more processors of a computer system, cause the computer system to at least:
- determine a compilation artifact to generate in response to one or more user operations received over a network;
- generate the compilation artifact based at least in part on a build description and a source file by at least:
  - determining one or more build computing resources described in the build description to include in a build instantiation, the one or more build computing resources including a plurality of computing resources of one or more other systems distributed over the network and connected to the computer system over the network; and
  - executing, by the build instantiation, the source file such that the build instantiation generates the compilation artifact using the one or more build computing resources of the one or more other systems distributed over the network; and
- provide the compilation artifact to one or more other computer systems.

14. The non-transitory computer-readable storage medium of claim 13, wherein the instructions that cause the computer system to determine the compilation artifact to generate in response to the one or more user operations further include instructions that cause the computer system to receive version information associated with the source file corresponding to at least one user operation of the one or more user operations.

15. The non-transitory computer-readable storage medium of claim 14, wherein the instructions that cause the computer system to receive version information further include instructions that cause the computer system to obtain a unique version identification number from the version information such that the unique version identification number is configured to validate the source file.

16. The non-transitory computer-readable storage medium of claim 13, wherein the instructions further comprise instructions that, when executed by the one or more processors, cause the computer system to obtain the source file from a code repository which is part of the computer system.

17. The non-transitory computer-readable storage medium of claim 16, wherein the instructions further comprise instructions that, when executed by the one or more processors, cause the computer system to obtain credentials configured to enable the computer system to access the code repository in order to obtain the source file.

18. The non-transitory computer-readable storage medium of claim 13, wherein the instructions further comprise instructions that, when executed by the one or more processors, cause the computer system to determine the build description based at least in part on information obtained from the source file and an availability of computing resources of the one or more other systems.

19. The non-transitory computer-readable storage medium of claim 13, wherein the instructions further comprise instructions that, when executed by the one or more processors, cause the computer system to receive the build description from an administrator associated with a software development project of which the source file is a part of.

20. The non-transitory computer-readable storage medium of claim 13, wherein the instructions that cause the computer system to provide the compilation artifact to the one or more other computer systems further include instructions that cause the computer system to transmit the compilation artifact to a computer system client device operated by the user and responsible for the one or more user operations.

* * * * *